United States Patent [19]

Shulzhenko et al.

[11] 3,906,082

[45] Sept. 16, 1975

[54] METHOD OF MAKING DIAMONDS SYNTHETICALLY

[76] Inventors: Alexandr Alexandrovich Shulzhenko, Novo-Konstantinovskaya, 17, kv. 27; Anatoly Fedorovich Getman, Syretskaya, 38, kv. 2, both of Kiev, U.S.S.R.

[22] Filed: Sept. 26, 1972

[21] Appl. No.: 292,396

Related U.S. Application Data

[63] Continuation of Ser. No. 68,006, Aug. 28, 1970, abandoned.

[52] U.S. Cl. .............................................. 423/446
[51] Int. Cl.[2] ...................... B01J 3/06; C01B 31/06
[58] Field of Search ............ 423/446; 252/502, 508, 252/509

[56] References Cited

UNITED STATES PATENTS

| | | | |
|---|---|---|---|
| 2,992,900 | 7/1961 | Bovenkerk | 423/446 |
| 3,148,161 | 9/1964 | Wentorf et al. | 252/502 |
| 3,325,254 | 6/1967 | Giardini et al. | 423/446 |
| 3,442,616 | 5/1969 | Wakatsuki et al. | 423/446 |
| 3,488,153 | 1/1970 | Bundy | 423/446 |

FOREIGN PATENTS OR APPLICATIONS

| | | | |
|---|---|---|---|
| 698,804 | 12/1964 | Canada | 423/446 |
| 251,683 | 9/1960 | Australia | 423/446 |

*Primary Examiner*—Edward J. Meros
*Assistant Examiner*—Eugene T. Wheelock
*Attorney, Agent, or Firm*—Holman & Stern

[57] ABSTRACT

A method of diamond synthesis, by which a reaction mixture is prepared comprising, taken in direct contact, a carbonaceous material and a combination of components selected from the group containing silver chloride, calcium carbonate, calcium oxide and from a group containing aluminium and boron. Then the reaction mixture is subjected to the action of a temperature of at least about 1,800°C and a pressure of at least 85 kbar for a time required for forming a diamond.

1 Claim, No Drawings

METHOD OF MAKING DIAMONDS SYNTHETICALLY

This is a continuation, of application Ser. No. 68006 now abandoned, filed Aug. 28, 1970.

The present invention relates to processes of production of superhard materials and, more particularly, the invention relates to methods of making diamonds synthetically.

Known in the art is a method of diamond synthesis, according to which a carbonaceous material in the presence of metals is subjected to the action of a temperature of at least about 1,800°C and a pressure corresponding to a selected temperature within the diamond stable region during a time required for its crystallization.

For example, a method of making diamonds synthetically is known (proposed by O.I. Leipunsky in 1939 "Progress in Chemistry," Vol. 8, No. 10, pp. 1519–1534, 1939) by which graphite is processed in conjunction with a medium (solvent), e.g., iron, at a pressure of higher than 45 kbar and a temperature exceeding 1,500°K (1,227°C). Later, a method of diamond synthesis was proposed, in which the medium consists of metals or alloys selected from the following elements: Ni, Co, Fe, Mn, Cr, Ta, Ru, Rh, Pd, Os, Jr, Pt. The synthesis is effected at pressures exceeding 50 kbar and a temperature exceeding 1,200°C (U.S. Pat. Nos. 2,947,609, 2,947,610 and 2,947,611).

The diamonds produced by the known methods contain a large amount of metallic inclusions. The quantity of impurities in the diamonds may be as high as 4%.

An object of the present invention is to provide a method of making diamonds synthetically, which would ensure production of diamonds having a minimum amount of impurities.

Another object of the invention is to provide a method of making diamonds synthetically, which would make it possible to produce transparent crystals.

Still another object of the invention is to make it possible to produce diamonds having an octahedron crystal habit.

These and other objects have been attained, according to the present invention, by providing a method of making diamonds synthetically, by which a carbonaceous material in the presence of metals is subjected to the action of a temperature of at least about 1,800°C and a pressure of at least about 85 kbar for a time sufficient for forming a diamond characterized in that in conjunction with the carbonaceous material and in direct contact therewith subjected to the above-stated action are components taken in combination, one of which comprises at least one compound containing silver chloride, calcium carbonate, calcium oxide, while the other component comprises at least one of the elements selected from the group containing aluminium and boron.

This ensures high purity of the produced diamond.

For carrying the proposed invention into effect, graphite and other carbonic materials can be used as the carbonaceous material which, when subjected to high temperature and pressure, liberate free carbon which is capable of transforming into diamond.

The best results were obtained when spectrally-pure graphite was used as a carbonaceous material.

The reaction compound may consist of a mixture of powders of spectrally-pure graphite and a combination of components one of which comprises at least one compound selected from the group containing silver chloride, calcium carbonate and calcium oxide, while the other component comprises one of the elements selected from the group containing aluminium and boron.

The proportion between the carbonaceous material and the above-said combination of components is not a decisive factor for carrying the proposed invention into effect.

The above-mentioned reaction compound is placed into a high-pressure high-temperature apparatus of any known type capable of providing pressure and temperature required for the synthesis of diamond.

For example, for this purpose a apparatus can be used which has a cylindrical reaction space and a base adjoining members of a hard alloy or steel, while the lateral surface is made of a material featuring heat and electro-insulating properties, e.g., pyrophylite.

The heating of the reaction compound under pressure can be effected by any known method, for example by using a special graphite heater fed with an electric current.

The pressure in the high-pressure apparatus is determined by a known method by measuring changes in the electric resistance under pressure of such metals as bismuth ($Bi_{II-III}$ – 27 kbar, $Bi_{III-V}$ – 89 kbar), thallium ($Tl_{II-III}$ – 3 kbar), barium ($Ba_{I-II}$ – 59 kbar).

The accuracy of measuring the pressure in the high-pressure apparatus at a temperature of 20°C was within ±6 kbar.

The temperature in the high-pressure apparatus is determined by the melting points of such metals as manganese, nickel, titanium, platinum.

The accuracy of measuring the temperature in the high-pressure apparatus at a pressure therein about 80 kbar is within ±100°C.

The present invention is carried into effect as follows.

EXAMPLE 1.

A homogeneous mixture of powders of spectrally-pure graphite, Al and $CaCO_3$ in a voluminal ratio of 1:1:1 was placed into a heater made of spectrally-pure graphite and was covered at both sides by disks of spectrally-pure graphite. Then the mixture was subjected to the action of a pressure of up to 95 kbar and a temperature of about 2,100°C and was held under these conditions during 3 min. After that the pressure and temperature was reduced to normal values, and the diamonds were removed. 10 experiments were carried out under these conditions. In each case synthesized diamonds were discovered.

EXAMPLE 2.

The experiment was conducted under the same conditions as in Example 1 but a mixture of Al and AgCl was used as a solvent. 17 experiments were conducted. In each case diamonds were discovered.

EXAMPLE 3.

The experiment was conducted under the same conditions as those stated in Example 1 but a mixture of B and AgCl was used as a solvent. 5 experiments were conducted. In each case diamonds were discovered.

EXAMPLE 4.

Disks of spectrally-pure graphite and disks of a mixture of Al + CaCO₃ + Bi were placed into a graphite heater layer-by-layer and were subjected to the action of a pressure of up to 89 kbar and a temperature of about 2,200°C and were held under these conditions during 10 min. After that the pressure and temperature were released and the diamonds were removed. 3 experiments were conducted. In each case diamonds were discovered.

EXAMPLE 5.

The experiment was conducted under the same conditions as in Example 1, but instead of CaCO₃ there was used CaO. 5 experiments were conducted. In each case diamonds were discovered.

EXAMPLE 6.

A homogeneous mixture of spectrally-pure graphite, Al and CaO in a voluminal ratio of 2:1:1 was placed into a heater of spectrally-pure graphite and covered at both sides by disks of spectrally-pure graphite. Then the mixture was subjected to the action of a pressure of up to 85 kbar and a temperature of up to 1,900°C, and was held under these conditions during 3 min. 10 experiments were conducted under the above conditions. In each case diamonds were discovered.

The diamonds produced by the method according to the present invention contained about 0.15% of impurities.

We claim:
1. A method of synthesizing diamonds comprising subjecting to a temperature of at least about 1,800°C, and a pressure of at least about 85 kbar for a time required for forming a diamond a reaction mixture consisting essentially of a homogeneous mixture of a carbonaceous material, silver chloride, and at least one element selected from the group consisting of aluminum and boron.

* * * * *